US012687040B2

(12) United States Patent
Huang

(10) Patent No.: US 12,687,040 B2
(45) Date of Patent: Jul. 21, 2026

(54) LOCK CAPABLE OF AUTOMATICALLY LOCKING A DOOR AFTER CLOSING

(71) Applicant: I-TEK METAL MFG. CO., LTD, Tainan (TW)

(72) Inventor: Tsung-Yu Huang, Tainan (TW)

(73) Assignee: I-TEK METAL MFG. CO., LTD, Tainan (TW)

(*) Notice: Subject to any disclaimer, the term of this patent is extended or adjusted under 35 U.S.C. 154(b) by 414 days.

(21) Appl. No.: 18/535,147

(22) Filed: Dec. 11, 2023

(65) Prior Publication Data

US 2025/0172015 A1 May 29, 2025

(30) Foreign Application Priority Data

Nov. 27, 2023 (TW) ................................ 112145779

(51) Int. Cl.

| | |
|---|---|
| ***E05B 59/00*** | (2006.01) |
| ***E05B 15/04*** | (2006.01) |
| ***E05B 63/08*** | (2006.01) |
| ***E05C 1/08*** | (2006.01) |

(52) U.S. Cl.

CPC ............. *E05B 59/00* (2013.01); *E05B 15/04* (2013.01); *E05B 63/08* (2013.01); *E05C 1/08* (2013.01); *E05B 2015/0406* (2013.01)

(58) Field of Classification Search

CPC .......... E05B 59/00; E05B 15/04; E05B 63/08; E05B 63/14; E05B 9/02; E05B 2015/0413; E05B 2063/207; E05C 1/08

USPC .................................................... 70/107, 108

See application file for complete search history.

(56) References Cited

U.S. PATENT DOCUMENTS

| | | |
|---|---|---|
| 1,643,932 A | 9/1927 | Teich |
| 1,687,009 A | 10/1928 | Drexler et al. |
| 2,820,241 A | 1/1958 | Schlage |
| 4,102,005 A | 7/1978 | Schnarr et al. |
| 4,107,877 A | 8/1978 | Lee |
| 4,267,619 A | 5/1981 | Suska |
| 4,348,835 A | 9/1982 | Jones et al. |
| 4,419,787 A | 12/1983 | Lieberman |
| 4,501,090 A | 2/1985 | Yoshida et al. |

(Continued)

FOREIGN PATENT DOCUMENTS

| | | | |
|---|---|---|---|
| AU | 2014339759 B2 | 5/2018 | |
| DE | 102004034529 B3 * | 4/2006 | ............. E05B 63/20 |

(Continued)

*Primary Examiner* — Kristina R Fulton
*Assistant Examiner* — James Edward Ignaczewski
(74) *Attorney, Agent, or Firm* — Che-Yang Chen; Law Office of Michael Chen

(57) ABSTRACT

A lock capable of automatically locking a door after closing includes a latch, an anti-theft latch, and a stop-latch. When the door is in an open position, the stop-latch is in an extended position to prevent the anti-theft latch from moving to an anti-theft position. When the door pivots to a closed position, the stop-latch moves to a retracted position, and the anti-theft latch moves to the anti-theft position. When the latch is moved to an unlatching position through normal operation, the anti-theft latch moves to a non-anti-theft position. Thus, the anti-theft latch will be in the anti-theft position when the door is in the closed position, and the anti-theft latch will move to the non-anti-theft position when the door is opened through normal operation.

6 Claims, 7 Drawing Sheets

(56) References Cited

U.S. PATENT DOCUMENTS 4,628,636 A 12/1986 Folger
4,867,496 A 9/1989 Thomas
5,040,331 A 8/1991 Merendino et al.
5,782,509 A 7/1998 Uyeda
6,177,771 B1 1/2001 Kinzer et al.
6,454,324 B1 9/2002 Lewis et al.
6,553,717 B2 4/2003 St. John et al.
6,578,888 B1 * 6/2003 Fayngersh .............. E05B 63/20 70/151 R
6,622,535 B2 9/2003 Chiang et al.
6,634,140 B1 10/2003 Sellman
6,732,557 B1 5/2004 Zehrung
6,745,603 B1 6/2004 Shaw
6,786,006 B2 9/2004 Kowalczyk et al.
6,891,479 B1 5/2005 Eccleston
6,978,646 B2 12/2005 Raatikainen
7,007,985 B2 * 3/2006 Alexander .............. E05B 59/00 70/486
7,051,403 B2 5/2006 Homberg
7,061,197 B1 6/2006 Mullet et al.
7,068,179 B2 6/2006 Snell et al.
7,143,547 B2 12/2006 Liles, Jr.
7,234,201 B2 6/2007 Brown et al.
7,240,524 B1 7/2007 White et al.
7,282,883 B2 10/2007 Mullet et al.
7,296,380 B2 11/2007 Backman
7,316,096 B2 1/2008 Houser et al.
7,418,800 B1 9/2008 Sellman
7,484,333 B2 2/2009 Houser et al.
7,555,867 B2 7/2009 Liles, Jr.
7,717,155 B2 5/2010 Mullet
7,774,984 B2 8/2010 Hsu
7,966,771 B2 6/2011 Bienek
8,109,038 B2 2/2012 Houser et al.
8,169,169 B2 5/2012 Hass et al.
8,201,858 B1 6/2012 Moon et al.
8,225,458 B1 7/2012 Hoffberg
8,248,005 B2 8/2012 Romer
8,359,790 B2 1/2013 Shin
8,382,008 B1 2/2013 Ricciardi et al.
8,390,219 B2 3/2013 Houser
8,393,054 B2 3/2013 Bienek
8,407,937 B2 4/2013 Houser
8,415,902 B2 4/2013 Burris et al.
8,434,268 B2 5/2013 Nixon
8,499,495 B2 8/2013 Houser et al.
8,523,248 B2 9/2013 Tien
8,540,290 B2 9/2013 Chen
8,547,046 B2 10/2013 Burris et al.
8,601,744 B2 12/2013 Wildforster et al.
8,641,104 B1 * 2/2014 Tien ........................ E05B 63/16 292/244
8,695,277 B2 4/2014 Romer et al.
8,773,237 B2 7/2014 Burris et al.
8,826,598 B2 9/2014 Ranaudo et al.
8,875,344 B2 11/2014 Salutzki et al.
8,904,710 B2 12/2014 Romer et al.
8,963,683 B2 2/2015 Romer
9,003,630 B2 4/2015 Hufen
9,045,927 B1 6/2015 Hoffberg
9,097,051 B2 8/2015 Hellwig
9,115,526 B2 8/2015 Houser et al.
9,121,217 B1 9/2015 Hoffberg
9,163,446 B2 10/2015 Houser et al.
9,181,744 B2 11/2015 Salutzki et al.
9,187,942 B2 11/2015 Wildforster
9,297,194 B2 3/2016 Bienek et al.
9,506,284 B2 11/2016 Braverman et al.
9,514,583 B2 12/2016 Zasowski et al.
9,631,412 B2 4/2017 Hellwig et al.
9,683,378 B2 6/2017 Houser et al.
9,695,620 B2 7/2017 Zasowski et al.
9,830,932 B1 11/2017 Gunderson et al.
9,869,117 B2 1/2018 Houser et al.
9,886,831 B1 2/2018 Svoboda et al.
9,890,565 B2 * 2/2018 Shiu ........................ E05B 63/08
9,995,076 B1 6/2018 Hoffberg
10,006,236 B2 6/2018 Hellwig et al.
10,024,094 B2 7/2018 Bell et al.
10,030,425 B2 7/2018 Zasowski et al.
10,030,426 B2 7/2018 Langenberg
10,077,591 B2 9/2018 Hass
10,180,023 B2 1/2019 Zasowski et al.
10,208,520 B2 2/2019 Long et al.
10,236,801 B2 3/2019 Dye et al.
10,253,540 B2 4/2019 Bell et al.
10,273,736 B2 4/2019 Hucker
10,280,670 B2 5/2019 Roberts
10,280,678 B1 5/2019 Rendon, Jr. et al.
10,304,272 B2 5/2019 Kvinge et al.
10,316,568 B2 6/2019 Langenberg et al.
10,344,502 B2 7/2019 McKibben et al.
10,415,301 B2 9/2019 Kuan
10,458,151 B1 10/2019 Shen
10,472,873 B2 11/2019 Ladha et al.
10,480,238 B1 11/2019 La Force
10,559,151 B2 2/2020 Kvinge et al.
10,648,198 B1 5/2020 Shen
10,648,208 B2 5/2020 Eickhoff
10,704,310 B1 7/2020 Barbon et al.
10,704,313 B2 7/2020 Houser et al.
10,724,288 B2 7/2020 Baumgarte
10,844,644 B2 11/2020 Langenberg et al.
10,968,677 B2 4/2021 Hass
11,002,055 B2 5/2021 Eickhoff et al.
11,124,997 B2 9/2021 Eickhoff
11,187,022 B1 11/2021 Hoffberg
11,250,655 B2 2/2022 Shen
11,286,692 B2 * 3/2022 Lien .......................... E05B 9/02
11,417,200 B2 8/2022 Hass et al.
11,542,727 B2 1/2023 Hsu
11,544,979 B1 1/2023 Shen
11,606,681 B2 3/2023 Shen
11,629,527 B2 4/2023 Hsu
11,629,544 B1 4/2023 Tien
11,631,292 B2 4/2023 Shen
11,661,782 B2 5/2023 Eickhoff et al.
11,727,770 B2 8/2023 Shen et al.
11,753,848 B2 9/2023 Tien
11,756,355 B2 9/2023 Shen
11,795,751 B2 10/2023 Tien
11,798,330 B2 10/2023 Shen
11,814,876 B2 11/2023 Huang
11,828,097 B1 11/2023 Tien
2002/0026750 A1 3/2002 St. John et al.
2002/0178655 A1 12/2002 Pedemonte
2003/0127869 A1 7/2003 Herron et al.
2003/0187805 A1 10/2003 Shen
2003/0204935 A1 11/2003 Kim
2005/0154612 A1 7/2005 Smith et al.
2006/0087125 A1 * 4/2006 Moon ..................... E05B 63/08 292/32
2006/0244271 A1 11/2006 Hass
2007/0022664 A1 2/2007 Mahonen et al.
2007/0114800 A1 5/2007 Kuo
2007/0256362 A1 11/2007 Hansen
2007/0268132 A1 11/2007 Milo
2008/0011030 A1 1/2008 Ferreira Sanchez et al.
2008/0087055 A1 * 4/2008 Chen ..................... E05B 13/004 70/107
2009/0265992 A1 10/2009 Hass et al.
2010/0107495 A1 5/2010 Bourgeois et al.
2010/0315229 A1 12/2010 Shin
2011/0094160 A1 4/2011 Houser
2011/0252597 A1 10/2011 Burris et al.
2011/0302841 A1 12/2011 Ye et al.
2012/0029701 A1 2/2012 Houser
2012/0159852 A1 6/2012 Houser et al.
2012/0190325 A1 7/2012 Abu-Hakima et al.
2013/0009785 A1 1/2013 Finn et al.
2013/0216438 A1 8/2013 Hill et al.
2013/0308778 A1 11/2013 Fosmark et al.
2013/0346333 A1 12/2013 Hassler et al.
2014/0026627 A1 1/2014 Rai et al.

(56) References Cited

U.S. PATENT DOCUMENTS

| | | | |
|---|---|---|---|
| 2014/0165329 | A1 | 6/2014 | Wildförster |
| 2014/0255252 | A1 | 9/2014 | Stratman et al. |
| 2014/0282934 | A1 | 9/2014 | Miasnik et al. |
| 2014/0325911 | A1 | 11/2014 | Hass |
| 2015/0070166 | A1 | 3/2015 | Boyden et al. |
| 2015/0113876 | A1 | 4/2015 | Burris et al. |
| 2015/0194033 | A1 | 7/2015 | Esposito et al. |
| 2015/0211278 | A1 | 7/2015 | Moyer et al. |
| 2015/0262438 | A1 | 9/2015 | Zasowski et al. |
| 2015/0339913 | A1 | 11/2015 | Lyman et al. |
| 2016/0220716 | A1 | 8/2016 | Childress et al. |
| 2016/0258189 | A1 | 9/2016 | Frolov |
| 2016/0281391 | A1* | 9/2016 | Bartholdi ................ E05B 63/20 |
| 2016/0312514 | A1 | 10/2016 | Leonard et al. |
| 2016/0348415 | A1 | 12/2016 | Baumgarte |
| 2016/0368455 | A1 | 12/2016 | Kim et al. |
| 2017/0175420 | A1* | 6/2017 | Chen ..................... E05B 13/002 |
| 2017/0275912 | A1 | 9/2017 | Murphy |
| 2017/0275921 | A1 | 9/2017 | Murphy et al. |
| 2017/0306668 | A1 | 10/2017 | Li et al. |
| 2017/0328100 | A1 | 11/2017 | Eickhoff |
| 2018/0223577 | A1 | 8/2018 | Hucker |
| 2018/0320414 | A1* | 11/2018 | Piantek ..................... E05C 1/04 |
| 2018/0334841 | A1 | 11/2018 | Langenberg et al. |
| 2018/0334845 | A1 | 11/2018 | Hass |
| 2019/0043289 | A1 | 2/2019 | Cahill |
| 2019/0043296 | A1 | 2/2019 | Baumgarte et al. |
| 2019/0145138 | A1 | 5/2019 | Eickhoff |
| 2019/0153764 | A1 | 5/2019 | Baumgarte |
| 2019/0203503 | A1 | 7/2019 | Chang |
| 2019/0264486 | A1 | 8/2019 | Toloday et al. |
| 2019/0319557 | A1 | 10/2019 | Dye et al. |
| 2019/0338576 | A1 | 11/2019 | Wang |
| 2019/0345738 | A1 | 11/2019 | McKibben et al. |
| 2019/0376316 | A1 | 12/2019 | Hsu |
| 2019/0376317 | A1 | 12/2019 | Hsu |
| 2019/0383080 | A1 | 12/2019 | Barbon et al. |
| 2020/0037142 | A1 | 1/2020 | Lofton |
| 2020/0190885 | A1 | 6/2020 | Coleman |
| 2020/0211362 | A1 | 7/2020 | Shen |
| 2020/0256108 | A1 | 8/2020 | Shetty et al. |
| 2020/0327758 | A1 | 10/2020 | Ma et al. |
| 2020/0372743 | A1 | 11/2020 | Miller et al. |
| 2021/0011443 | A1 | 1/2021 | McNamara et al. |
| 2021/0012598 | A1 | 1/2021 | Giebat et al. |
| 2021/0023248 | A1 | 1/2021 | Townsend et al. |
| 2021/0056791 | A1 | 2/2021 | Shen |
| 2021/0123287 | A1 | 4/2021 | Miller et al. |
| 2021/0134096 | A1 | 5/2021 | Pukari |
| 2021/0217260 | A1 | 7/2021 | Chen |
| 2021/0252179 | A1 | 8/2021 | Grinstead et al. |
| 2021/0308311 | A1 | 10/2021 | Stewart et al. |
| 2022/0148393 | A1 | 5/2022 | Shen et al. |
| 2022/0307316 | A1 | 9/2022 | Soderqvist |
| 2023/0104006 | A1 | 4/2023 | Tien |
| 2023/0133080 | A1 | 5/2023 | Tien |
| 2023/0374820 | A1 | 11/2023 | Huang |

FOREIGN PATENT DOCUMENTS

| | | | | |
|---|---|---|---|---|
| DE | 102005040744 | A1 * | 3/2007 | ............. E05B 59/00 |
| DE | 102016202225 | A1 | 8/2017 | |
| DE | 102017209467 | A1 | 12/2018 | |
| EP | 0107151 | A1 | 5/1984 | |
| EP | 1788169 | A1 | 5/2007 | |
| EP | 2677098 | A1 * | 12/2013 | ........... E05B 15/101 |
| EP | 2933415 | A1 | 10/2015 | |
| EP | 3550528 | A1 | 9/2019 | |
| EP | 3805490 | A1 | 4/2021 | |
| GB | 2572027 | A | 9/2019 | |
| KR | 20210019168 | A | 2/2021 | |
| KR | 20210033154 | A | 3/2021 | |
| WO | 8800633 | A1 | 1/1988 | |
| WO | 2021007588 | A1 | 1/2021 | |
| WO | 2021050616 | A1 | 3/2021 | |
| WO | 2021214134 | A1 | 10/2021 | |
| WO | 2022063950 | A1 | 3/2022 | |
| WO | 2022063952 | A1 | 3/2022 | |
| WO | 2023036744 | A1 | 3/2023 | |

* cited by examiner

LOCK CAPABLE OF AUTOMATICALLY LOCKING A DOOR AFTER CLOSING

BACKGROUND OF THE INVENTION

The present invention relates to a lock capable of automatically locking a door after closing and, more particularly, to a locking including an anti-theft latch which will automatically move to an extended, anti-theft position and which will retract to a non-anti-theft position when a latch of the lock is moved to a retracted, unlatching position.

A lock case currently available on the market can be mounted inside a door and includes a latch and an anti-theft latch which can operate separately from the latch. The latch is coupled with a latch hole in a door frame around the door in a closed position, preventing opening of the door. The lock case is operatively connected to inner and outer operating devices which are mounted on two sides of the door. When the anti-theft latch is in a retracted, non-anti-theft position, the inner and outer operating devices can actuate the latch to move to a retracted, unlatching position permitting opening of the door. The anti-theft latch can be moved to an anti-theft position engaged with an anti-theft hole of the door frame through additional operation. When the anti-theft latch is in the anti-theft position, even if the inner and outer operating devices are used to move the latch to the unlatching position, the door is still restricted by the anti-theft latch and, thus, cannot be opened. In this case, even though a person at the indoor side intends to open the door, the person must move the anti-theft latch to the non-anti-theft position and operate the inner operating device to move the latch to the unlatching position for opening the door, causing inconvenience in use.

Furthermore, after the door is closed, separate operation for moving the anti-theft latch to the anti-theft position is required when it is desired to achieve a complete anti-theft function, which is not convenient.

BRIEF SUMMARY OF THE INVENTION

To overcome the above drawback, the present invention provides a lock comprising:

a case body;

a latch movably coupled to the case body and movable between a latching position and an unlatching position;

a connecting member pivotably connected to the case body, wherein the connecting member includes a push end operatively connected to the latch, wherein pivotal movement of the connecting member actuates the latch to move from the latching position to the unlatching position;

an anti-theft latch movably coupled to the case body and movable between an anti-theft position and a non-anti-theft position;

a stop rod pivotably connected to the case body, wherein movement of the anti-theft latch causes pivotal movement of the stop rod, and wherein when the stop rod is not pivotable, the anti-theft latch is prevented from moving from the non-anti-theft position to the anti-theft position;

a stop-latch movably coupled to the case body, wherein the stop-latch is movable between an extended position and a retracted position, wherein when the stop-latch is in the extended position, pivotal movement of the stop rod is prevented, and wherein when the stop-latch is in the retracted position, the stop rod is pivotable, and the anti-theft latch is movable from the non-anti-theft position to the anti-theft position.

When the door pivots to the closed position, the anti-theft latch will automatically displaces to the anti-theft position to assure the anti-theft function of the door in the closed position, which is more convenient in use.

In an example, the lock further comprises:

an anti-theft control member pivotably connected to the case body, wherein the anti-theft control member includes a first push end operatively connected to the anti-theft latch and an arm spaced from the first push end; and a locking spring including an end coupled to the case body and another end coupled to the arm, wherein when the stop-latch is in the retracted position, the locking spring pivots the anti-theft control member and actuates anti-theft latch to move from the non-anti-theft position to the anti-theft position, and wherein when the stop-latch is in the extended position, the anti-theft latch is prevented from moving from the non-anti-theft position to the anti-theft position, and the locking spring is incapable of pivoting the anti-theft control member.

In an example, the lock further comprises the connecting member further includes an interlocking portion. The anti-theft control member includes a third push end located between the first push end and the arm in a circumferential direction of a pivotal axis of the anti-theft control member. When the anti-theft latch is in the non-anti-theft position, the third push end is spaced from the interlocking portion. When the anti-theft latch is in the anti-theft position, the third push end abuts the interlocking portion, such that the latch moves from the latching position to the unlatching position while the connecting member pivots, and the interlocking portion presses against the third push end to thereby pivot the anti-theft control member and actuate the anti-theft latch to move from the anti-theft position to the non-anti-theft position.

Given the door closed, the anti-theft latch in the anti-theft position, and the latch in the latching position, when the inner handle or the outer handle (the outer operating device is unlocked) is turned to pivot the connecting member, the latch can be moved to the latching position, the anti-theft latch can be moved to the non-anti-theft position, and the door can be directly opened. This avoids additional operation for moving the anti-theft latch to the non-anti-theft position, which is more convenient in use.

In an example, the lock case further comprises an anti-theft control member pivotably connected to the case body. The anti-theft control member includes a first push end operatively connected to the anti-theft latch and a third push end spaced from the first push end. The connecting member further includes an interlocking portion. When the anti-theft latch is in the non-anti-theft position, the third push end is spaced from the interlocking portion. When the anti-theft latch is in the anti-theft position, the third push end abuts the interlocking portion, such that the latch moves from the latching position to the unlatching position while the connecting member pivots, and the interlocking portion presses against the third push end to thereby pivot the anti-theft control member and actuate the anti-theft latch to move from the anti-theft position to the non-anti-theft position.

In an example, the anti-theft latch further includes an extension portion having a stop side. The stop-latch includes a stop arm. A stop end of the stop rod abuts the stop side. When the stop-latch is in the extended position, the stop arm abuts the stop end to prevent rotation of the stop rod. When the stop-latch is in the retracted position, the stop arm is spaced from the stop end to permit rotation of the stop rod.

The stop rod and the stop-latch cooperate with the stop side of the anti-theft latch, such that when the door is opened, the anti-theft latch cannot be moved to the anti-theft position to effectively avoid the disadvantage of impact to the door frame by the anti-theft latch in the anti-theft position.

In an example, the lock further comprises:

an unlatching rod pivotably connected to the case body, wherein the unlatching rod includes a first push portion and a second push portion spaced from the first push portion, wherein the second push portion is operatively connected to the latch, wherein when the unlatching rod pivots, the latch moves from the latching position to the unlatching position, and wherein the anti-theft control member further includes a second push end spaced from the first push end; and a locking operation device mounted to the case body, wherein the locking operation device includes a pivotable push block, wherein with the anti-theft latch in the anti-theft position and with the latch in the latching position, rotation of the push block firstly presses against the second push end to pivot the anti-theft control member and to actuate the anti-theft latch to move from the anti-theft position to the non-anti-theft position, and then the push block presses against the first push portion to pivot the unlatching rod to thereby move the latch toward the unlatching position.

In an example, when the anti-theft latch is in the non-anti-theft position, the second push end is outside of a pivotal path of the push block, and wherein when the anti-theft latch is in the anti-theft position, the second push end is on the pivotal path of the push block.

When the anti-theft latch is in the non-anti-theft position, the second push end of the anti-theft control member is outside of the pivotal path of the locking operation device. Thus, when the door is not in the closed state, the locking operation device cannot be used to move the anti-theft latch to the anti-theft position. This avoids the door frame from being impacted by the anti-theft latch in the anti-theft position during closing of the door.

In an example, the lock further comprises:

an unlatching rod pivotably connected to the case body, wherein the unlatching rod includes a first push portion and a second push portion spaced from the first push portion, wherein the second push portion is operatively connected to the latch, and wherein when the unlatching rod pivots, the latch moves from the latching position to the unlatching position;

an anti-theft control member pivotably connected to the case body, wherein the anti-theft control member includes a first push end operatively connected to the anti-theft latch and a second push end spaced from the first push end; and a locking operation device mounted to the case body, wherein the locking operation device includes a pivotable push block, wherein with the anti-theft latch in the anti-theft position and with the latch in the latching position, rotation of the push block presses against the second push end and the first push portion to pivot the anti-theft control member and the unlatching rod, thereby actuating the anti-theft latch to move toward the non-anti-theft position and moving the latch toward the unlatching position.

The present invention will become clearer in light of the following detailed description of illustrative embodiments of this invention described in connection with the drawings.

Figure 1:
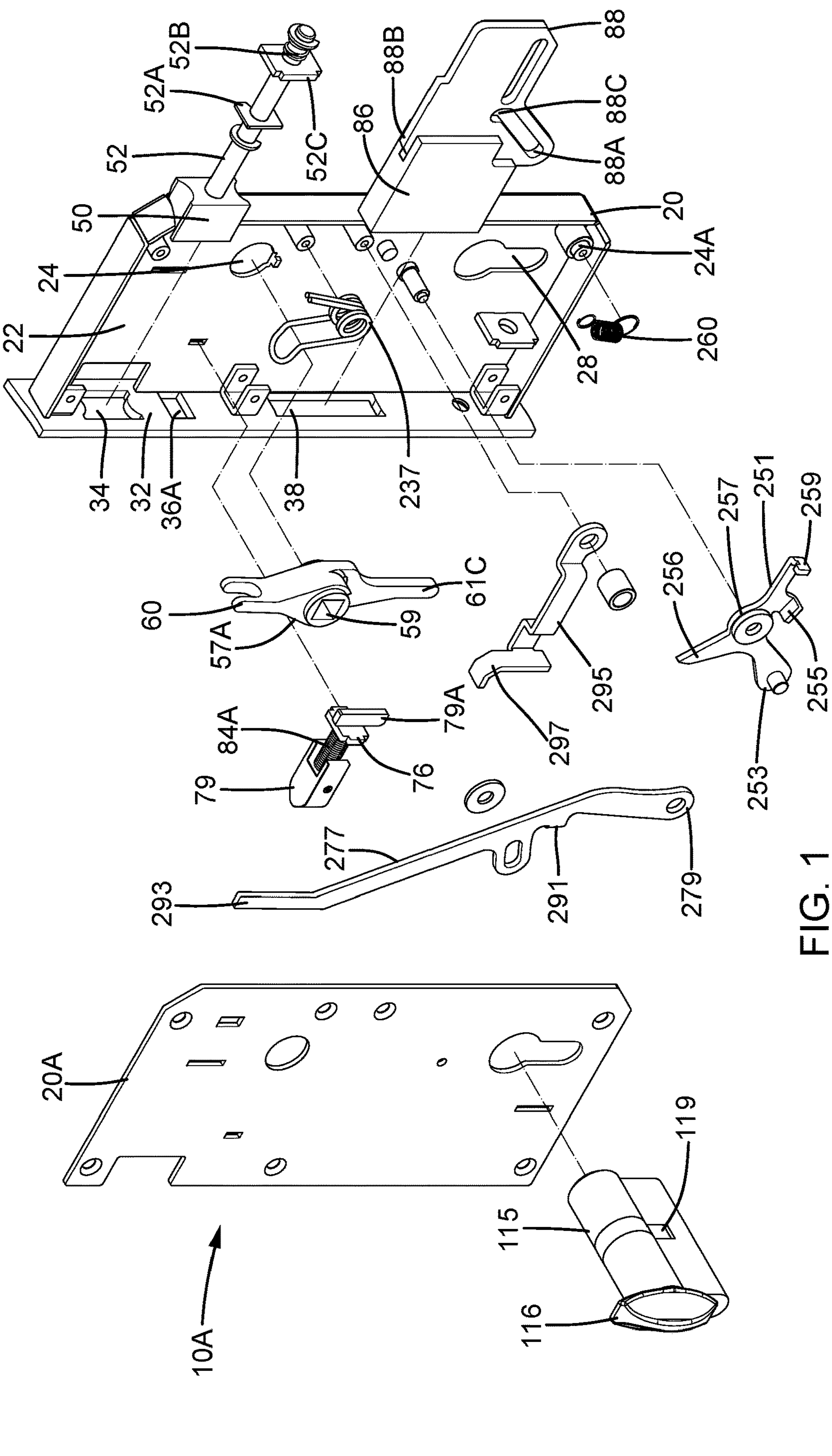
FIG. 1 is an exploded, perspective view of a lock of an embodiment according to the present invention.

All figures are drawn for ease of explanation of the basic teachings of the present invention only; the extensions of the figures with respect to number, position, relationship, and dimensions of the parts to form the embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "third", "lower", "upper", "inner", "outer", "side", "end", "portion", "axial", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
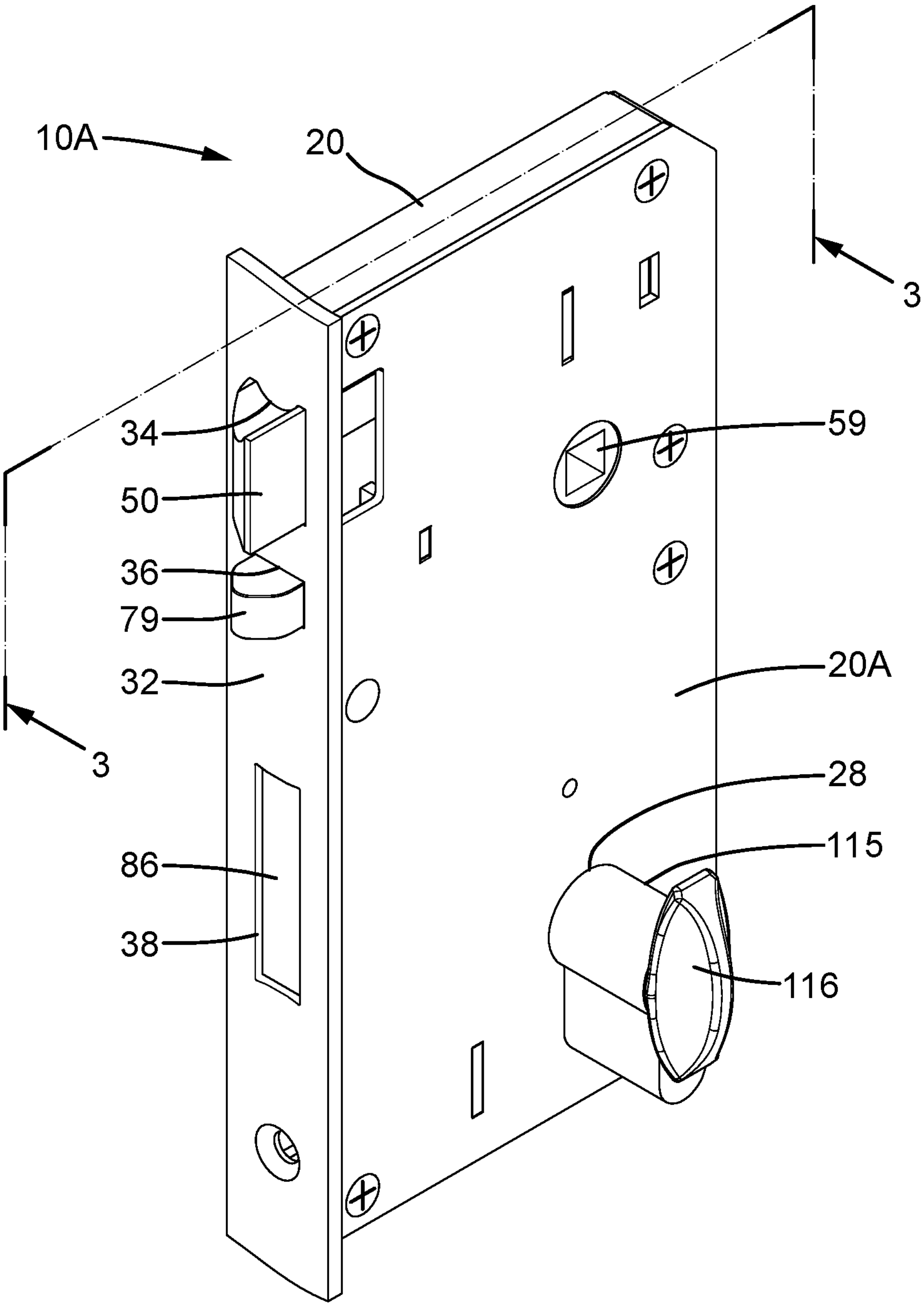
FIG. 2 is a perspective view of the lock of FIG. 1 after assembly.
Figure 3:
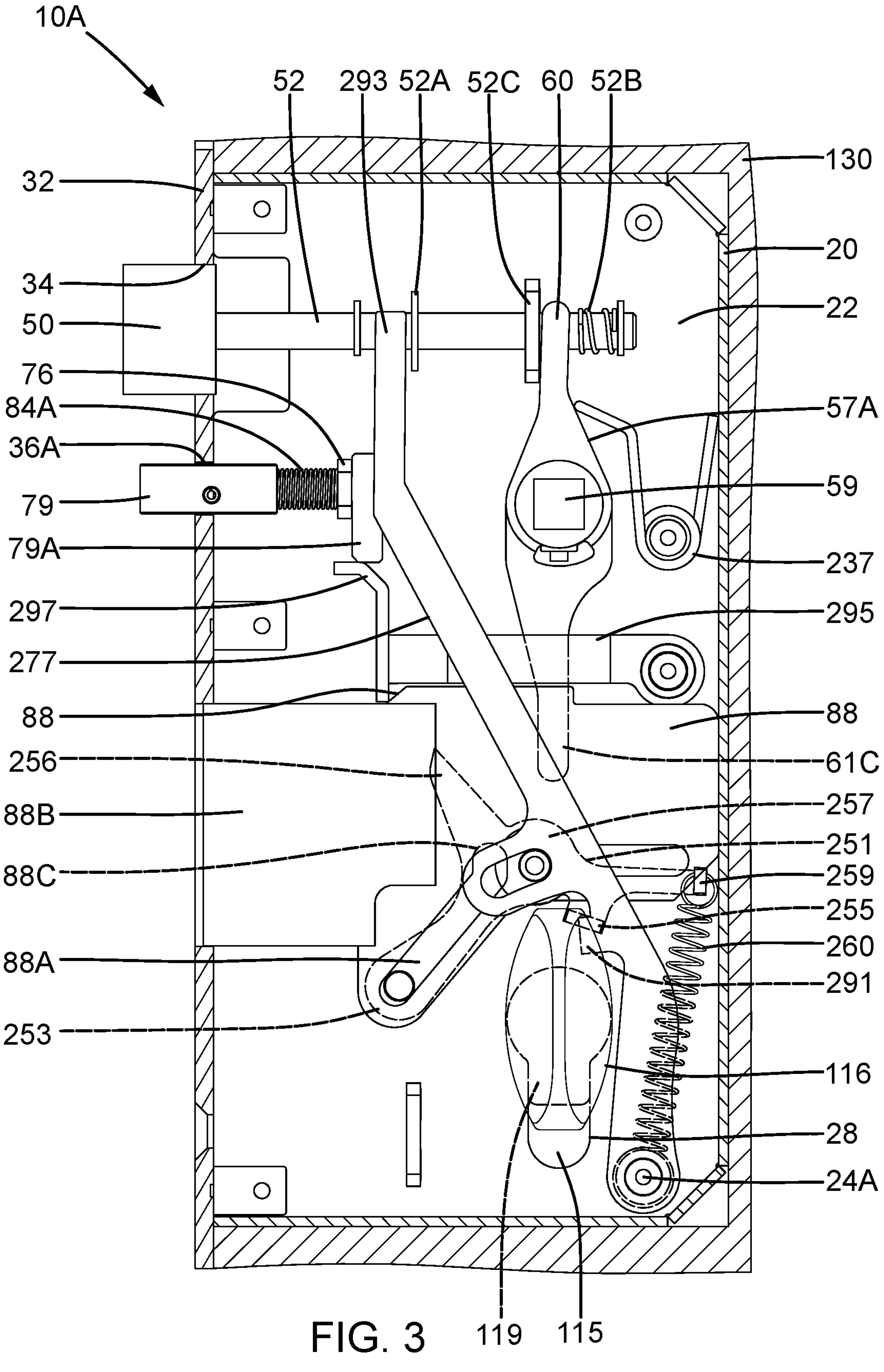
FIG. 3 is a cross sectional view taken along section line 3-3 of FIG. 2.

The present invention relates to a lock 10A which can be mounted in a door 130 to retain the door 130 in a closed position. With reference to FIGS. 1-3, the lock 10A includes a case body 20 having a bottom wall 22, an end plate 32 substantially extending perpendicularly to the bottom wall 22, and a lid 20A opposite to the bottom wall 22. First and second pivotal portions 24 and 24A are formed on the bottom wall 22 and spaced from each other. The first pivotal portion 24 can be in the form of a cylindrical hole, and the second pivotal portion 24A can be in the form of a cylinder. A lock core hole 28 is formed on the bottom wall 22 of the case body 20.

The end plate 32 includes a latch hole 34, a stop-latch hole 36, and an anti-theft latch hole 38. The stop-latch hole 36 is located between the latch hole 34 and the anti-theft latch hole 38.

The lock 10A further includes a latch 50 slidably mounted to the case body 20. The latch 50 includes a rod 52 extending from an end face thereof. The rod 52C includes a first interlocking portion 52A, a second interlocking portion 52B, and a third interlocking portion 52C. The second interlocking portion 52B is closer to the distal end of the rod 52 than the first interlocking portion 52A. The third interlocking portion 52C is located between the first interlocking portion 52A and the second interlocking portion 52B. The second interlocking portion 52B may be but not limited to in the form of a compression spring.

Figure 5:
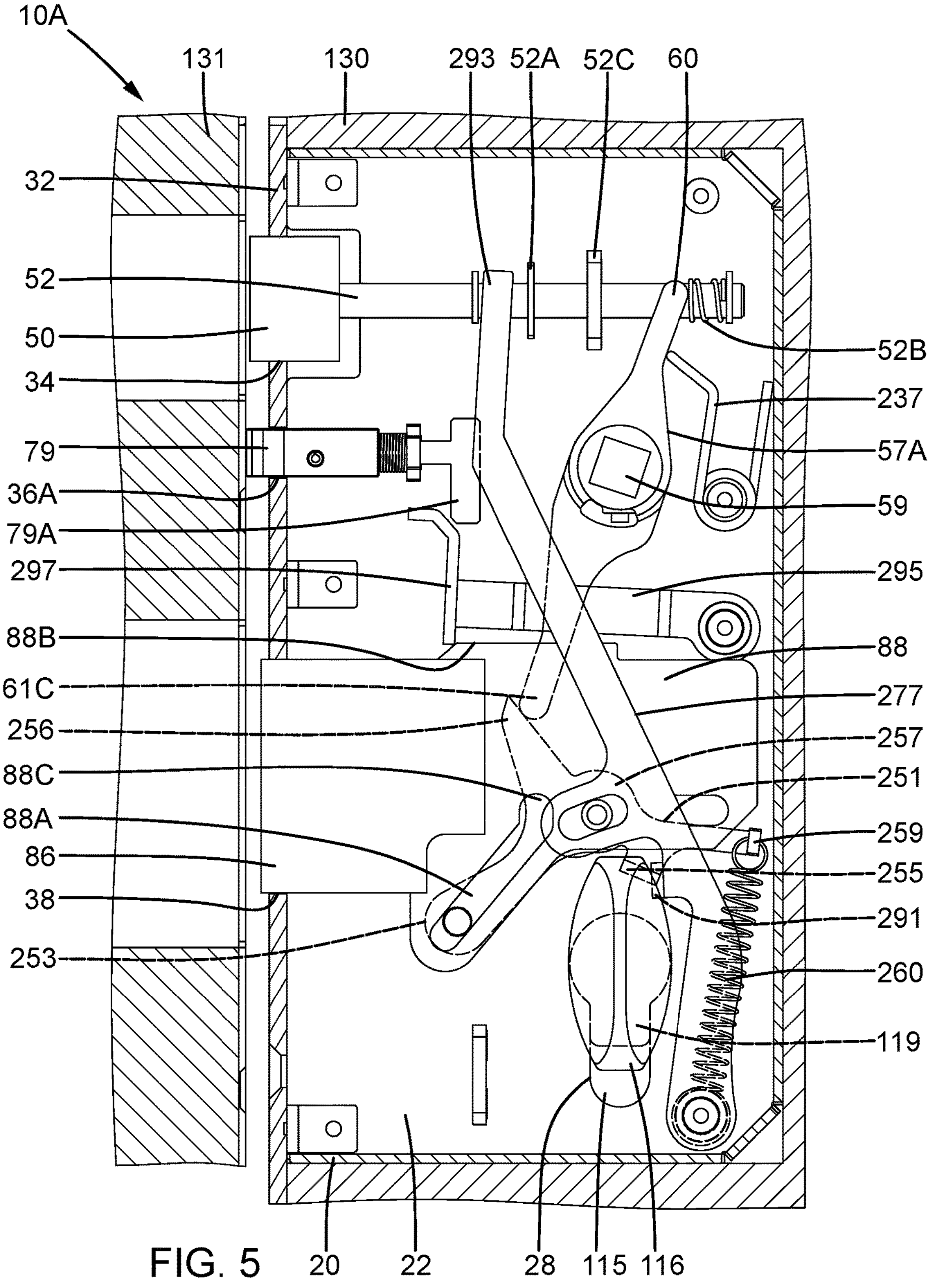
FIG. 5 is a cross sectional view of the lock illustrating pivotal movement of a connecting member through operation of an inner operating device or an outer operating device to move a latch and an anti-theft latch.
Figure 6:
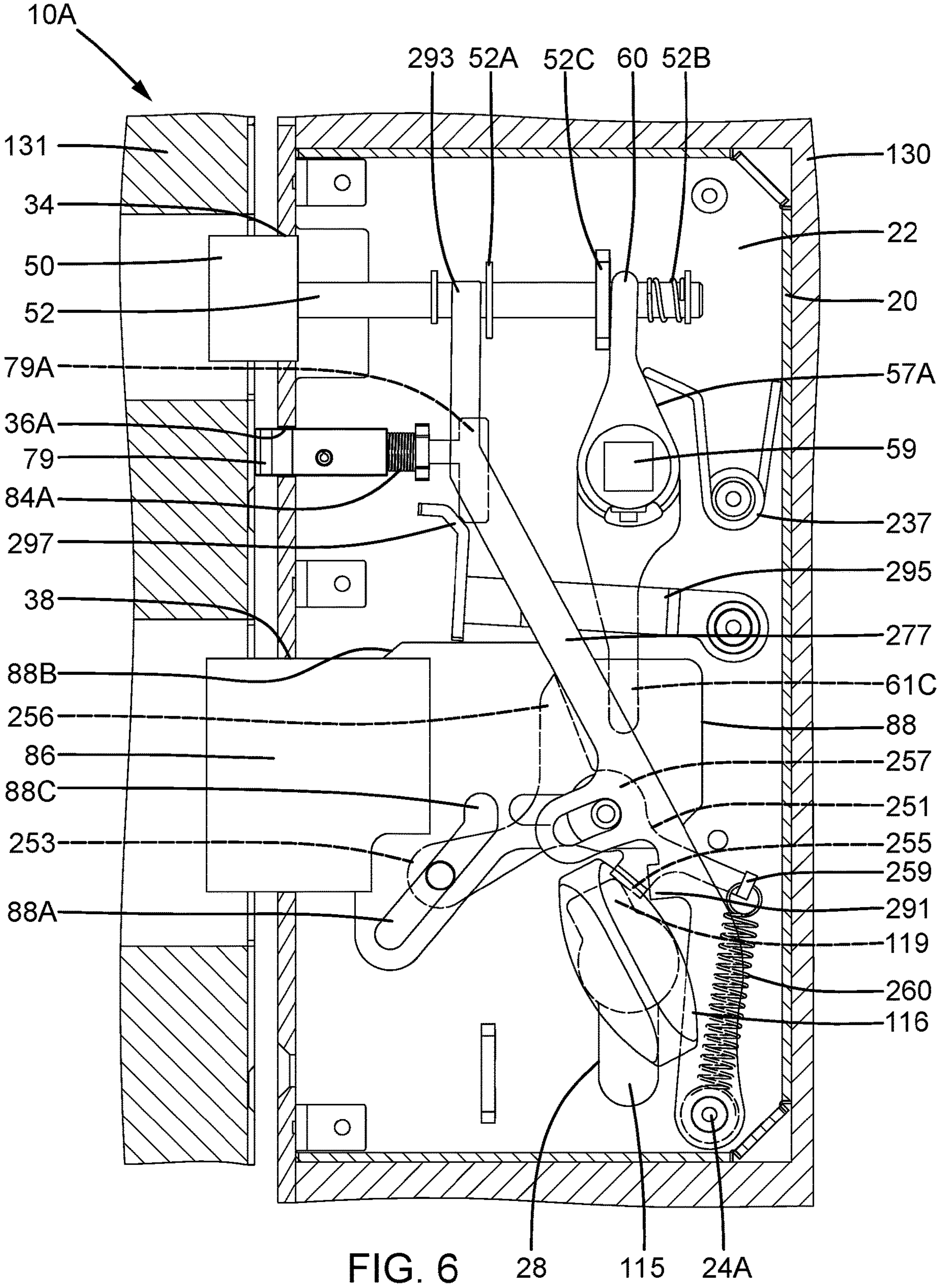
FIG. 6 is a cross sectional view of the lock illustrating operation of a lock operating device to actuate the latch and the anti-theft latch.
Figure 7:
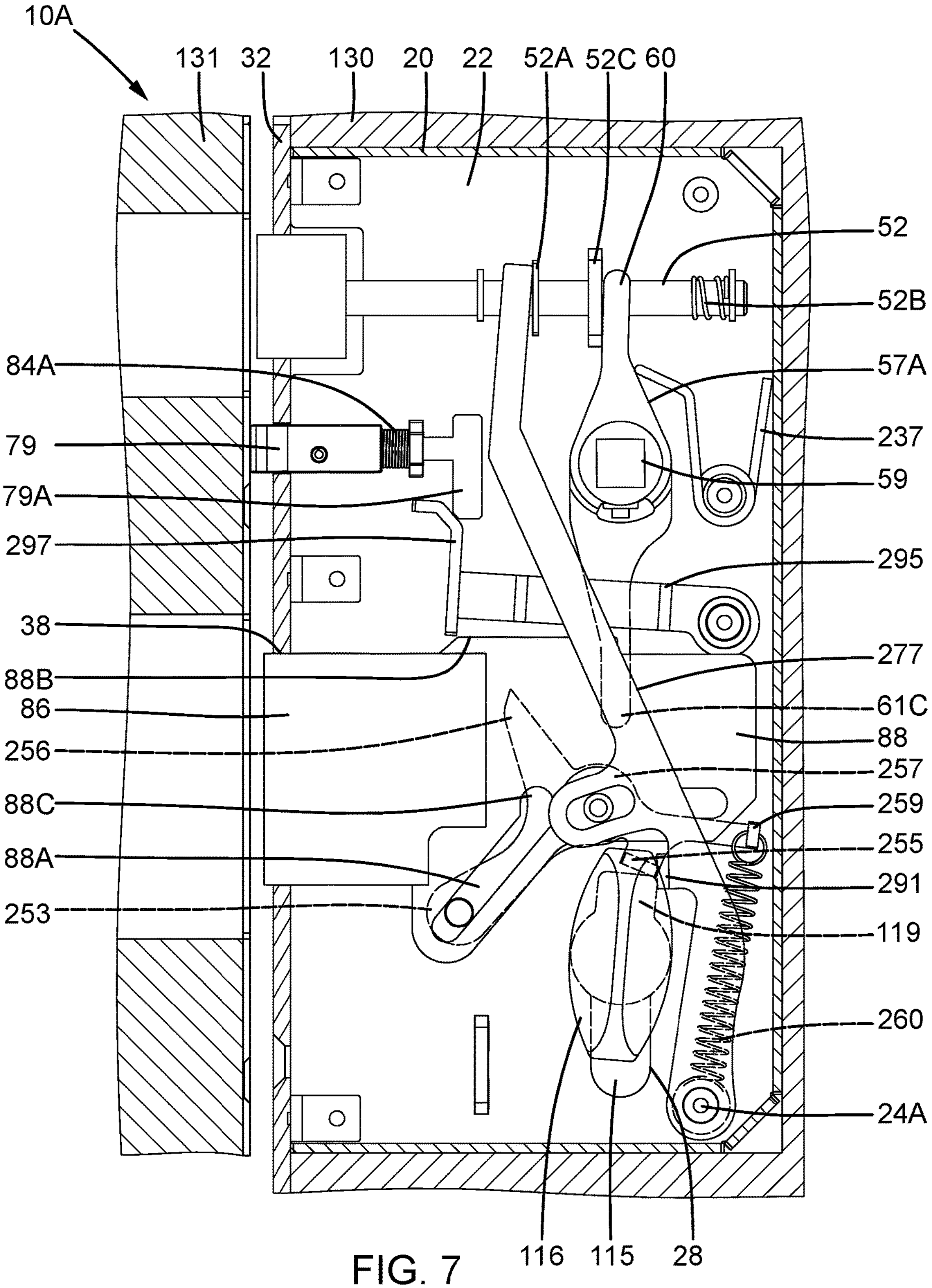
FIG. 7 is a cross sectional view of the lock illustrating operation of the locking operation device to move the latch to the unlatching position and to move the anti-theft latch to a non-anti-theft position.

The latch 50 slidably extends through the latch hole 34, such that the latch 50 is movable in an axial direction of the rod 52 between a latching position (FIG. 3) and an unlatching position (FIGS. 5-7). The extent of the latch 50 in the latching position protruding beyond the end plate 32 is greater than that of the latch 50 in the unlatching position protruding beyond the end plate 32.

The lock 10A further includes a connecting member 57A pivotably connected to the case body 20. The connecting member 57A includes a connecting hole 59 coaxial with a pivotal axis of the connecting member 57A. The connecting member 57A further includes a push end 60 eccentric to the connecting hole 59 and an interlocking portion 61C spaced from the push end 60 in a circumferential direction about the pivotal axis of the connecting member 57A. The connecting member 57A is pivotably connected to the first pivotal portion 24 of the case body 20. The push end 60 is abuttingly disposed between the second interlocking portion 52B and the third interlocking portion 52C.

A biasing spring 237 is received in the case body 20 and includes an end abutting the case body 20 and another end abutting the push end 60 of the connecting member 57A. Thus, the push end 60 of he connecting member 57A biases the latch 50 toward the latching position.

Figure 4:
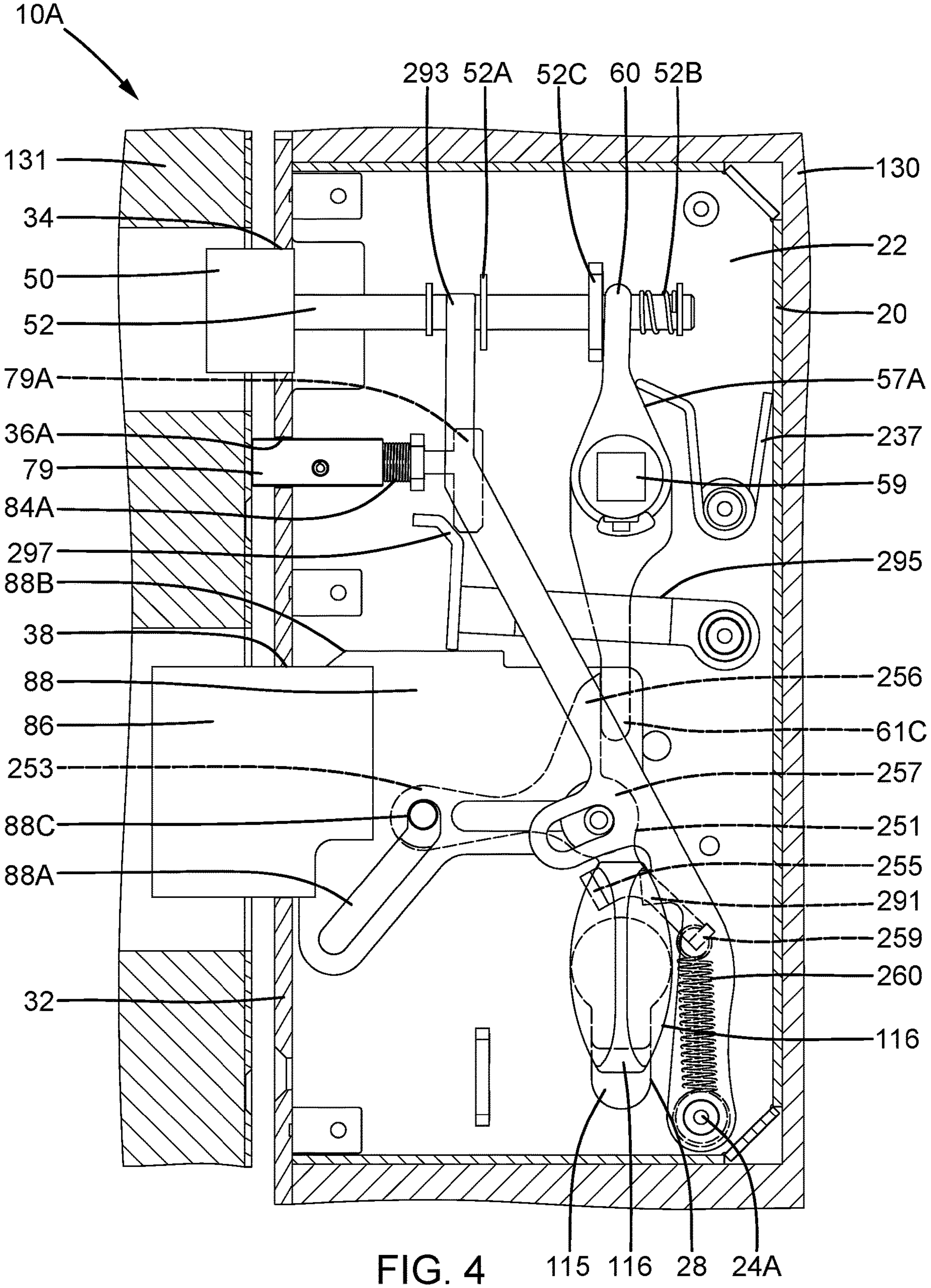
FIG. 4 is a cross sectional view of the lock mounted in a door in a closed position.

The lock 10A further includes a stop-latch 79 slidably coupled to the case body 20 and a supporting member 76. The supporting member 76 can be in the form of a piece fixed on the bottom wall 22 of the case body 20. The stop-latch 79 includes a stop arm 79A. The stop-latch 79 is slidably coupled with the stop-latch hole 36A. Thus, the stop-latch 79 is movable between an extended position (FIG. 3) and a retracted position (FIG. 4). An extent of the stop-latch 79 in the extended position protruding beyond the end plate 32 is greater than that of the stop-latch 79 in the retracted position protruding beyond the end plate 32. A spring 84A is disposed between the stop-latch 79 and the supporting member 76 and biases the stop-latch 79 towards the extended position.

The lock 10A further includes an anti-theft latch 86 slidably coupled with the anti-theft latch hole 38 of the case body 20. The anti-theft latch 86 includes an extension portion 88. The extension portion 88 includes a push track 88A (which is slant) and a stop side 88B spaced from the push track 88A. The push track 88A includes a retaining section 88C at a distal end thereof. The retaining section 88C is substantially perpendicular to the movement direction of the anti-theft latch 86. In a non-restrictive example, the stop side 88B may include a horizontal section parallel to the movement direction of the anti-theft latch 86 and a slant section at a slant angle relative to the horizontal section. The anti-theft latch 86 is movable between an anti-theft position and a non-anti-theft position in an axial direction of the anti-theft latch hole 38. When the anti-theft latch 86 is in the non-anti-theft position, the anti-theft latch 86 does not protrude beyond the end plate 32. On the other hand, when the anti-theft latch 86 is in the anti-theft position, an end of the anti-theft latch 86 protrudes beyond the end plate 32.

The heavy duty lock 10A further comprises a stop rod 295 pivotably connected to the case body 20. The stop rod 295 includes a stop end 297 which is remote to a pivotal axis of the stop rod 295 and which is enlarged. The stop end 297 of the stop rod 295 abuts the stop side 88B of the anti-theft latch 86. Thus, when the anti-theft latch 86 displaces, the stop side 88B will actuate the stop end 297 to thereby cause pivotal movement of the stop rod 295.

Furthermore, with reference to FIG. 3, when the stop-latch 79 is in the extended position, the stop arm 79A is aligned with the stop end 297, such that the stop end 297 is restricted by the stop side 88B and the stop arm 79A, thereby preventing the stop rod 295 from pivoting. With reference to FIG. 4, when the stop-latch 79 is in the retracted position, stop arm 79A is spaced from the stop end 297, such that the stop rod 295 is pivotable, thereby permitting the anti-theft latch 86 to move from the non-anti-theft position to the anti-theft position.

The lock 10A further includes an unlatching rod 277 pivotably received in the case body 20 and an anti-theft control member 251. The anti-theft control member 251 includes a pivotal portion 257 pivotably connected to the case body 20. The anti-theft control member 251 further includes a first push end 253, a third push portion 256, and an arm 259, all of which extend outward from the pivotal portion 257. The anti-theft control member 251 further includes a second push end 255 formed on a side of the arm 259. The first push end 253 is located between the third push end 256 and the arm 259 in a circumferential direction about a pivotal axis of the pivotal portion 257 of the anti-theft control member 251 and is spaced from the second push end 255.

The first push end 253 of the anti-theft control member 251 is slidably coupled with the push track 88A of the anti-theft latch 86, such that pivotal movement of the anti-theft control member 251 causes movement of the anti-theft latch 86 to the anti-theft position or the non-anti-theft position. A locking spring 260 is disposed between the case body 20 and the arm 259. The locking spring 260 may be but not limited to a tension spring. The locking spring 260 biases the anti-theft control member 251 to create a torque for moving the anti-theft latch 86 toward the anti-theft position.

The unlatching rod 277 includes a first push portion 291, a second push portion 293, and an engaging portion 279. The first push portion 291 is located between the second push portion 293 and the engaging portion 279. The engaging portion 279 of the unlatching rod 277 is pivotably connected to the second pivotal portion 24A of the case body 20, and the second push portion 293 abuts the first interlocking portion 52A of the latch 50. Thus, when the unlatching rod 277 pivots, the second push portion 293 presses against the first interlocking portion 52A to move the latch 50 from the latching position to the unlatching position.

The lock 10A further includes a locking operation device 115 having a pivotable push block 119. The locking operation device 115 further includes a knob 116 interlocked with the push block 119 and a lock core (not shown) received therein. The knob 116 can be turned to drive the push block 119 to pivot. The push block 119 can be pivoted only after a key is used to unlock the lock core.

The locking operation device 115 is coupled with the lock core hole 28 of the case body 20. The knob 116 is located on an indoor side. The lock core is located on an outdoor side. The push block 119 is aligned with the first push portion 291 and the second push end 255 in the axial direction of the lock core hole 28.

The lock 10A is mounted to an inner side of the door 130 pivotably mounted in a door frame 131, permitting the door 130 to pivot relative to the frame 131 to an open position and the closed position. Although not specifically shown, the lock 10A according to the present invention may be used together with currently available electronic type inner and outer operating devices. The inner operating device includes an inner handle operatively coupled with the connecting hole 59 of the connecting member 57A. The outer operating device includes an outer handle operatively coupled with the connecting hole 59 of the connecting member 57A. Furthermore, the outer handle of the outer operating device rotates idly when the outer operating device is set to a locking state, such that the outer operating device cannot drive the connecting member 57A to pivot and, thus, cannot move the latch 50 to the unlatching position. Thus, before the outer operating device is unlocked, the door 130 cannot be opened from the outside by the outer operating device.

Now that the basic construction of the lock 10A of the present invention has been explained, the operation and some of the advantages of the lock 10A can be set forth and appreciated. In particular, for the sake of explanation, it will be assumed that the door 130 is not closed (see FIG. 3), and the latch 50 is in the latching position. The stop-latch 79 is in the extended position, and the anti-theft latch 86 is in the non-anti-theft position. Thus, the third push end 256 of the anti-theft control member 251 is spaced from the interlocking portion 61C of the connecting member 57A. In this case, the second push end 255 of the anti-theft control member 251 is located outside of the pivotal path of the push block 119 of the locking operation device 115. Therefore, pivotal movement of the push block 119 cannot actuate the anti-theft control member 251.

The stop arm 79A of the stop-latch 79 is aligned with the stop end 297 of the stop rod 295, such that the stop rod 295 cannot pivot. The stop end 297 abuts the slant section of the stop side 88B. Thus, movement of the anti-theft latch 86 toward the anti-theft position will actuate the stop end 297 of the stop rod 295 to pivot toward the stop arm 79A. Since the stop end 297 is stopped by the stop arm 79A, the anti-theft latch 86 cannot move from the non-anti-theft position toward the anti-theft position. Therefore, when the door 130 is opened, the anti-theft latch 86 cannot displace to the anti-theft position.

With reference to FIG. 4, with the door 130 pivots to the closed state, the stop arm 79A is pressed by the frame 131 to move from the extended position to the retracted position, such that the stop arm 79A moves along the movement direction of the stop-latch 79 to a position spaced from the stop end 297, such that the stop rod 295 becomes pivotable. At the same time, the latch 50 is pressed by the door frame 131 and moves from the latching position to the unlatching position. The push end 60 is actuated by the third interlocking portion 52C, such that the connecting member 57A twists the biasing spring 237 to generate a returning force.

In this state, the locking spring 260 actuates the anti-theft control member 251 to pivot, and the first push end 253 actuates the anti-theft latch 86 to move from the non-anti-theft position to the anti-theft position. The stop side 88B presses against the stop end 297 to pivot the stop rod 295, such that the anti-theft latch 86 smoothly moves from the non-anti-theft position to the anti-theft position. When the anti-theft latch 86 is in the anti-theft position, the anti-theft latch 86 engages with the door frame 131. Furthermore, when the anti-theft latch 86 moves to the anti-theft position, the second push end 255 moves to a position on the pivotal path of the push block 119 of the locking operation device 115, and the third push end 256 abuts the interlocking portion 61C, as shown in FIG. 4. Thus, when the door 130 pivots from the open state to the closed state, the anti-theft latch 86 will move from the non-anti-theft position to the anti-theft position and engages with the door frame 131.

With reference to FIG. 4, when the anti-theft latch 86 is in the anti-theft position, the first push end 253 is in the retaining section 88C. Since the retaining section 88C is substantially perpendicular to the movement direction of the anti-theft latch 86, the anti-theft latch 86 in the anti-theft position is directly pressed from the outer side of the end plate 32 and, thus, cannot move toward the non-anti-theft position.

Furthermore, the biasing spring 237 biases the push end 60, such that the connecting member 57A pivots and returns to its original position. Then, the push end 60 presses against the third interlocking portion 52C, such that the latch 50 returns from the unlatching position to the latching position and engages with the door frame 131, and the stop-latch 79 is stopped by the frame 131 and, thus, retained in the retracted position.

In this state, when the outer operating device is set to the locking state (the inner operating device does not include this locking state setting function), the outer operating device cannot be used to pivot the connecting member 57A of the lock 10A and, thus, cannot move the latch 50 to the unlatching position. Thus, the latch 50 remains in the latching position, and the anti-theft latch 86 remains in the anti-theft position, such that the door 130 cannot be opened from the outside.

In a case that a thief on the outside of the door 130 intends to pick the latch 50 via a gap between the door 130 and the door frame 131, even if the latch 50 is picked and moves to the unlatching position, the anti-theft latch 86 will still remain in the anti-theft position, thereby avoiding unauthorized opening of the door 130.

When it is desired to open the door 130, the inner handle of the inner operating device or the outer handle of the outer operating device (which is in an unlocking state) can be directly pivoted. With reference to FIG. 5, the connecting member 57A pivots when the inner handle or the outer handle is turned, and the push end 60 presses against the second interlocking portion 52B to move the latch 50 from the latching position to the unlatching position. At the same time, the interlocking portion 61C presses against the third push end 256 to pivot the anti-theft control member 251, and the first push end 253 presses against the push track 88A, thereby moving the anti-theft latch 86 from the anti-theft position to the non-anti-theft position. When the latch 50 reaches the unlatching position and the anti-theft latch 86 reaches the non-anti-theft position, the door 130 can be opened.

With reference to FIGS. 6 and 7, when the door 130 is closed, the locking operation device 115 can also be used to move the latch 50 and the anti-theft latch 86. Specifically, the locking operation device 115 permits a user at the outdoor side to use a key to unlock the lock core to thereby pivot the push block 119 or permits a user at the indoor side to turn the knob 116 to thereby pivot the push block 119. When the latch 50 is in the latching position and the anti-theft latch 86 is in the anti-theft position, rotation of the push block 119 firstly presses against the second push end 255 of the anti-theft control member 251 (see FIG. 6), such that the anti-theft control member 251 pivots. The arm 259 stretches the locking spring 260, and the first push end 253 disengages from the retaining section 88C. Then, the first push end 253 actuates the anti-theft latch 86 to move from the anti-theft position to the non-anti-theft position.

As shown in FIG. 7, when the push block 119 pivots to a position pressing against the first push portion 291 of the unlatching rod 277, the unlatching rod 277 pivots, and the second push portion 293 presses against the first interlocking portion 52A. Thus, the latch 50 moves from the latching position toward the unlatching position while the anti-theft latch 86 moves toward the non-anti-theft position. Thus, when the anti-theft latch 86 is in the non-anti-theft position and the latch 50 is in the unlatching position, the door 130 can be opened.

As can be known from the technical features of the lock 10A according to the present invention, when the door 130 pivots to the closed position, the anti-theft latch 86 will automatically displaces to the anti-theft position to assure the anti-theft function of the door 130 in the closed position, which is more convenient in use.

Given the door 130 closed, the anti-theft latch 86 in the anti-theft position, and the latch 50 in the latching position, when the inner handle or the outer handle (the outer operating device is unlocked) is turned to pivot the connecting member 57A, the latch 50 can be moved to the latching position, the anti-theft latch 86 can be moved to the non-anti-theft position, and the door 130 can be directly opened. This avoids additional operation for moving the anti-theft latch 86 to the non-anti-theft position, which is more convenient in use.

When the anti-theft latch 86 is in the non-anti-theft position, the second push end 255 of the anti-theft control member 251 is outside of the pivotal path of the locking operation device 115. Thus, when the door 130 is not in the closed state, the locking operation device 115 cannot be used to move the anti-theft latch 86 to the anti-theft position. This avoids the door frame 131 from being impacted by the anti-theft latch 86 in the anti-theft position during closing of the door.

The stop rod 295 and the stop-latch 79 cooperate with the stop side 88B of the anti-theft latch 86, such that when the door 130 is opened, the anti-theft latch 86 cannot be moved to the anti-theft position to effectively avoid the disadvantage of impact to the door frame 131 by the anti-theft latch 86 in the anti-theft position.

Now that the basic teachings of the present invention have been explained, many extensions and variations will be obvious to one having ordinary skill in the art. For example, the lock 10A does not have to include the unlatching rod 277. In this case, although operation of the locking operation device 115 can only move the anti-theft latch 86 to the non-anti-theft position, operation of the inner operating device or the outer operating device still can move the latching 50 to the unlatching position.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A lock comprising:

a case body;

a latch movably coupled to the case body and movable between a latching position and an unlatching position;

a connecting member pivotably connected to the case body, wherein the connecting member includes a push end operatively connected to the latch, wherein pivotal movement of the connecting member actuates the latch to move from the latching position to the unlatching position;

an anti-theft latch movably coupled to the case body and movable between an anti-theft position and a non-anti-theft position;

a stop rod pivotably connected to the case body, wherein movement of the anti-theft latch causes pivotal movement of the stop rod, and wherein when the stop rod is not pivotable, the anti-theft latch is prevented from moving from the non-anti-theft position to the anti-theft position;

a stop-latch movably coupled to the case body, wherein the stop-latch is movable between an extended position and a retracted position, wherein when the stop-latch is in the extended position, pivotal movement of the stop rod is prevented, and wherein when the stop-latch is in the retracted position, the stop rod is pivotable, and the anti-theft latch is movable from the non-anti-theft position to the anti-theft position;

an anti-theft control member pivotably connected to the case body, wherein the anti-theft control member includes a first push end operatively connected to the anti-theft latch and an arm spaced from the first push end;

a locking spring including an end coupled to the case body and another end coupled to the arm, wherein when the stop-latch is in the retracted position, the locking spring pivots the anti-theft control member and actuates anti-theft latch to move from the non-anti-theft position to the anti-theft position, and wherein when the stop-latch is in the extended position, the anti-theft latch is prevented from moving from the non-anti-theft position to the anti-theft position, and the locking spring is incapable of pivoting the anti-theft control member;

an unlatching rod pivotably connected to the case body, wherein the unlatching rod includes a first push portion and a second push portion spaced from the first push portion, wherein the second push portion is operatively connected to the latch, wherein when the unlatching rod pivots, the latch moves from the latching position to the unlatching position, and wherein the anti-theft control member further includes a second push end spaced from the first push end; and a locking operation device mounted to the case body, wherein the locking operation device includes a pivotable push block, wherein with the anti-theft latch in the anti-theft position and with the latch in the latching position, rotation of the push block firstly presses against the second push end to pivot the anti-theft control member and to actuate the anti-theft latch to move from the anti-theft position to the non-anti-theft position, and then the push block presses against the first push portion to pivot the unlatching rod to thereby move the latch toward the unlatching position.

2. The lock as claimed in claim 1, wherein the connecting member further includes an interlocking portion, wherein the anti-theft control member includes a third push end located between the first push end and the arm in a circumferential direction of a pivotal axis of the anti-theft control member, wherein when the anti-theft latch is in the non-anti-theft position, the third push end is spaced from the interlocking portion, and wherein when the anti-theft latch is in the anti-theft position, the third push end abuts the interlocking portion, such that the latch moves from the latching position to the unlatching position while the connecting member pivots, and the interlocking portion presses against the third push end to thereby pivot the anti-theft control member and actuate the anti-theft latch to move from the anti-theft position to the non-anti-theft position.

3. The lock as claimed in claim 1, further comprising an anti-theft control member pivotably connected to the case body, wherein the anti-theft control member includes a first push end operatively connected to the anti-theft latch and a third push end spaced from the first push end, wherein the connecting member further includes an interlocking portion, wherein when the anti-theft latch is in the non-anti-theft position, the third push end is spaced from the interlocking portion, wherein when the anti-theft latch is in the anti-theft position, the third push end abuts the interlocking portion, such that the latch moves from the latching position to the unlatching position while the connecting member pivots, and the interlocking portion presses against the third push end to thereby pivot the anti-theft control member and actuate the anti-theft latch to move from the anti-theft position to the non-anti-theft position.

4. The lock as claimed in claim 1, wherein the anti-theft latch further includes an extension portion having a stop side, wherein the stop-latch includes a stop arm, wherein a stop end of the stop rod abuts the stop side, wherein when the stop-latch is in the extended position, the stop arm abuts the stop end to prevent rotation of the stop rod, wherein when the stop-latch is in the retracted position, the stop arm is spaced from the stop end to permit rotation of the stop rod.

5. The lock as claimed in claim 1, wherein when the anti-theft latch is in the non-anti-theft position, the second push end is outside of a pivotal path of the push block, and wherein when the anti-theft latch is in the anti-theft position, the second push end is on the pivotal path of the push block.

6. The lock as claimed in claim 1, wherein when the anti-theft latch is in the non-anti-theft position, the second push end is outside of a pivotal path of the push block, and wherein when the anti-theft latch is in the anti-theft position, the second push end is on the pivotal path of the push block.

* * * * *